US010877745B2

(12) United States Patent
Wang

(10) Patent No.: US 10,877,745 B2
(45) Date of Patent: Dec. 29, 2020

(54) APPARATUS AND METHOD FOR THREAD DATA PROCESSING

(71) Applicant: TENCENT TECHNOLOGY (SHENZHEN) COMPANY LIMITED, Shenzhen (CN)

(72) Inventor: Chuandong Wang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 16/297,241

(22) Filed: Mar. 8, 2019

(65) Prior Publication Data
US 2019/0205123 A1 Jul. 4, 2019

Related U.S. Application Data

(63) Continuation of application No. PCT/CN2017/101444, filed on Sep. 12, 2017.

(30) Foreign Application Priority Data

Oct. 28, 2016 (CN) .......................... 2016 1 0966687

(51) Int. Cl.
*G06F 9/54* (2006.01)
*G06F 11/36* (2006.01)
(Continued)

(52) U.S. Cl.
CPC .................. *G06F 8/71* (2013.01); *G06F 9/52* (2013.01); *G06F 9/542* (2013.01); *G06F 11/36* (2013.01);
(Continued)

(58) Field of Classification Search
CPC ............... G06F 9/52–548; G06F 9/528; G06F 11/34–3696
See application file for complete search history.

(56) References Cited

U.S. PATENT DOCUMENTS 8,051,418 B1    11/2011 Dice
8,626,904 B1 *   1/2014 Olliff ...................... G06F 9/524
                                            709/224
(Continued)

FOREIGN PATENT DOCUMENTS

CN    101354677 A    1/2009
CN    102722559 A    10/2012
(Continued)

OTHER PUBLICATIONS

Panteleymonov, Andriy. "Interoperable thin client separation from gui applications." Proceedings of the Sixth European Conference on Software Maintenance and Reengineering. IEEE, 2002. (Year: 2002).*
(Continued)

*Primary Examiner* — Doon Y Chow
*Assistant Examiner* — Joanne G Macasiano
(74) *Attorney, Agent, or Firm* — Sughrue Mion, PLLC

(57) ABSTRACT

A thread data processing method is provided. Obtain a probing response corresponding to a target thread is started, the probing response being a response message generated in a normal running process of the target thread. Whether the probing response is obtained within a time duration of a first predetermined time length from a start of obtaining of the probing response is detected. Function call information of the target thread is obtained based on detection that the probing response is not obtained within the time duration of the first predetermined time length, the function call information indicating a function call condition of the target thread.

18 Claims, 5 Drawing Sheets

(51) Int. Cl.
*G06F 9/52* (2006.01)
*G06F 8/71* (2018.01)
(52) U.S. Cl.
CPC ...... *G06F 11/3624* (2013.01); *G06F 11/3648* (2013.01); *G06F 2201/86* (2013.01)

(56) References Cited

U.S. PATENT DOCUMENTS

| | | | | |
|---|---|---|---|---|
| 9,953,093 | B1* | 4/2018 | Cudich | G06F 16/986 |
| 2002/0162053 | A1* | 10/2002 | Os | G06F 11/366 |
| | | | | 714/38.13 |
| 2007/0101324 | A1* | 5/2007 | Lupu | G06F 9/524 |
| | | | | 718/1 |
| 2012/0297371 | A1 | 11/2012 | Greifeneder et al. | |

FOREIGN PATENT DOCUMENTS

| | | |
|---|---|---|
| CN | 104268055 A | 1/2015 |
| CN | 104461829 A | 3/2015 |
| CN | 105740080 A | 7/2016 |
| CN | 105740326 A | 7/2016 |

OTHER PUBLICATIONS

Song, Xiang, Haibo Chen, and Binyu Zang. "Why software hangs and what can be done with it." 2010 IEEE/IFIP International Conference on Dependable Systems & Networks (DSN). IEEE, 2010. (Year: 2010).*

Bouillon, Yannick, and Fabrice Wendling. "Model-based approach to control over concurrency in interactive CSCW applications. Application to telemedicine." Annales des télécommunications. vol. 58. No. 5-6. Springer-Verlag, 2003. (Year: 2003).*

Communication dated Dec. 25, 2019, from the China National Intellectual Property Administration in counterpart Application No. 201610966687.3.

International Search Report for PCT/CN2017/101444 dated Dec. 7, 2017 [PCT/ISA/210].

Written Opinion of the International Searching Authority dated Dec. 7, 2017, in International Application No. PCT/CN2017/101444.

Communication dated Jun. 9, 2020, from the State Intellectual Property Office of the P.R.C. in application No. 201610966687.3.

* cited by examiner

APPARATUS AND METHOD FOR THREAD DATA PROCESSING

CROSS-REFERENCE TO RELATED APPLICATIONS

This application is a continuation of International Application No. PCT/CN2017/101444, filed on Sep. 12, 2017, in the Chinese Patent Office, which claims priority from Chinese Patent Application No. 201610966687.3, filed on Oct. 28, 2016, in the Chinese Patent Office, of which disclosures are incorporated herein by reference in their entireties.

BACKGROUND

1. Field

Apparatuses and methods consistent with exemplary embodiments relate to the field of software test technologies, and in particular, to apparatuses and methods for thread data processing.

2. Description of the Related Art

In the related art, there is a problem that a thread becomes stuck in a software developing and test process. In order to fix the problem that the thread is stuck, a developer needs to obtain function call information when the thread is stuck so as to analyze a function called by the thread when the thread is stuck so as to investigate code of the related function.

In an operating progress of an application program, when a user detects a target thread in the application program is stuck when using the application program, the user may send a corresponding problem report. The developer packs a program of a debuggable version of the application program and a tester reproduces the stuck phenomenon in the program of the debuggable version. For example, the tester constantly repeats operations related to the target thread in the program of the debuggable version until the target thread is stuck. After the stuck phenomenon of the target thread is reproduced, the developer exports function call information of the target thread in the program of the debuggable version by using a debugging tool and learns, based on the function call information, a function call condition when the target thread is stuck.

In the related art technology, a significant time consumption is required between the target thread is found to be stuck and the developer packs the program of the debuggable version, leading to poor timeliness of problem fixing. In addition, since the tread being stuck is an accidental phenomenon, reproduction of the stuck phenomenon can succeed only after the tester performs operations for hundreds to thousands times. This wastes a large amount of test time and greatly deteriorates test efficiency of the application program. Moreover, when there is a difference between a program of a debuggable version and an application program of an officially-released version, this may lead to a problem that a deviation is generated in a process of reproducing a phenomenon that thread data is stuck and affect accuracy of a test result.

SUMMARY

One or more exemplary embodiments provide apparatuses and methods for thread data processing, which solve technical problems in the related art technology in that test efficiency and accuracy are degraded due to the need for reproducing the stuck phenomenon hundreds to thousands of test operations.

According to an aspect of an exemplary embodiment, provided is a thread data processing method. Obtaining a probing response corresponding to a target thread is started, the probing response being a response message generated in a normal running process of the target thread. Whether the probing response is obtained within a time duration of a first predetermined time length from a start of obtaining of the probing response is detected. Function call information of the target thread is obtained based on detection that the probing response is not obtained within the time duration of the first predetermined time length, the function call information indicating a function call condition of the target thread.

According to an aspect of another exemplary embodiment, provided is a thread data processing apparatus. The thread data processing apparatus includes at least one memory configured to store program code; and at least one processor configured to access the at least one memory and operate according to the program code. The program code includes detection code; response detection code; and information obtaining code. The detection code causes the at least one processor to start to obtain a probing response corresponding to a target thread, the probing response being a response message generated in a normal running process of the target thread. The response detection code causes the at least one processor to detect whether the probing response is obtained within a time duration of a first predetermined time length from a start of obtaining of the probing response. The information obtaining code causes the at least one processor to obtain function call information of the target thread based on detection that the probing response is not obtained within the time duration of the first predetermined time length, the function call information indicating a function call condition of the target thread.

According to an aspect of still another exemplary embodiment, provided is a non-transitory computer-readable storage medium storing program code. The program code, when executed by at least one processor, causes the at least one processor to perform: starting to obtain probing response corresponding to a target thread, the probing response being a response message generated in a normal running process of the target thread; detecting whether the probing response is obtained within a time duration of a first predetermined time length from a start of obtaining of the probing response; and obtaining function call information of the target thread based on detection that the probing response is not obtained within the time duration of the first predetermined time length, the function call information indicating a function call condition of the target thread.

BRIEF DESCRIPTION OF THE DRAWINGS

These and/or other aspects of the disclosure will become apparent and more readily appreciated from the following description of the exemplary embodiments, taken in conjunction with the accompanying drawings, in which.

DETAILED DESCRIPTION

Exemplary embodiments are described in detail herein, and examples of the exemplary embodiments are shown in the accompanying drawings. When the following descriptions relate to the accompanying drawings, unless otherwise indicated, same numbers in different accompanying drawings represent same or similar elements. The implementations described in the following exemplary embodiments do not represent all implementations consistent with the disclosure. On the other hand, the implementations are merely examples of apparatuses and methods that are described in detail in the appended claims and that are consistent with some aspects of the disclosure.

Figure 1:
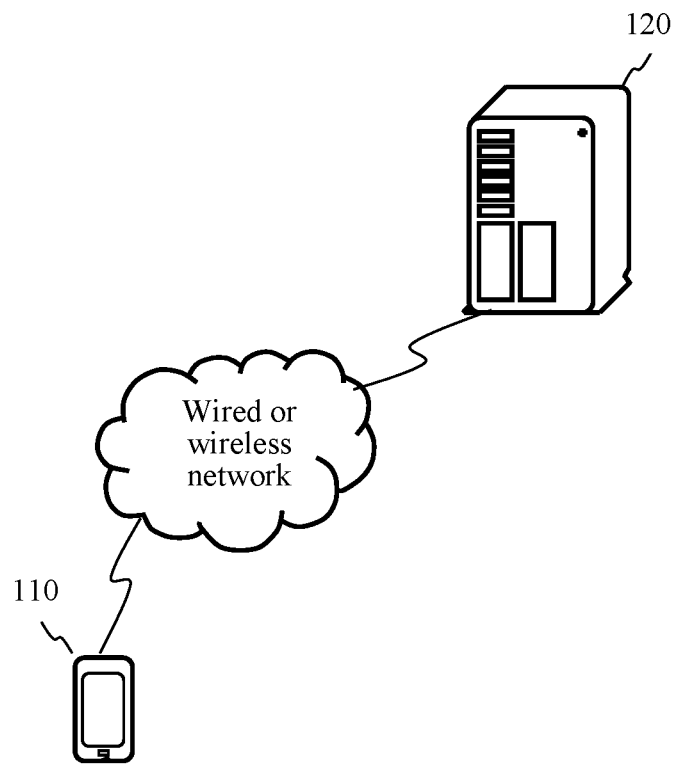
FIG. 1 is a schematic diagram of an implementation environment according to an exemplary embodiment.

FIG. 1 is a schematic diagram of an implementation environment according to an exemplary embodiment. The implementation environment according to an exemplary embodiment may include a terminal 110 and a server 120.

The terminal 110 may be a terminal having a function of running a third-party application program. For example, the terminal 110 may be a mobile terminal such as a smartphone, a tablet computer, or an ebook reader. Alternatively, the terminal 110 may be a desktop computer, a notebook computer, or the like.

The server 120 may be a single server, a server cluster formed by multiple computers, and/or a cloud service platform.

The terminal 110 and the server 120 are connected and perform data communication with each other by using a wired or a wireless network.

In a solution according to an exemplary embodiment, when a third-party application program runs in the terminal 110, a monitoring component may automatically detect whether a target thread in the third-party application program is stuck. When detecting that the target thread is stuck, the monitoring component automatically obtains function call information of the target thread. That is, in a running process of an officially-released third-party application program, when the target thread is stuck, the function call information of the target thread may be obtained in time. A developer does not need to repack a program of a debuggable version, and a tester does not need to reproduce a phenomenon that the thread is stuck. This prevents a process of reproducing the phenomenon that the thread is stuck from wasting a large amount of test time, and avoids a problem, which is caused due to a difference that exists between the program of the debuggable version and an application program of an officially-released version, that a deviation is generated in the process of reproducing the phenomenon that thread data is stuck.

In the solution of an exemplary embodiment, the monitoring component may be implemented by code in the third-party application program corresponding to the target thread, that is, the monitoring component may be a functional component in the third-party application program, a plug-in in the third-party application program, or a program component independent of the third-party application program.

Figure 2:
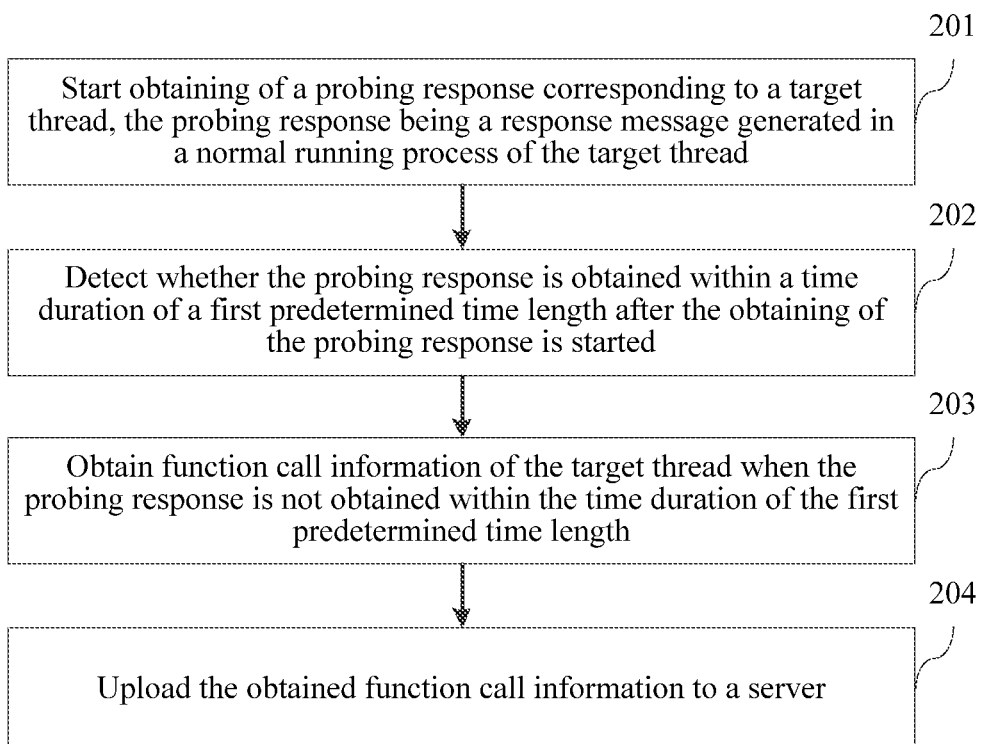
FIG. 2 is a flowchart of a thread data processing method according to an exemplary embodiment.

FIG. 2 is a flowchart of a thread data processing method according to an exemplary embodiment. The thread data processing method shown in FIG. 2 may be applied to the terminal 110 in the implementation environment shown in FIG. 1. As shown in FIG. 2, the thread data processing method may include the following operations.

Operation 201: Start obtaining of a probing response corresponding to a target thread, the probing response being a response message generated in a normal running process of the target thread.

A thread is a smallest call unit in a running process of a program, and is sometimes referred to as a lightweight process (LWP). In a running process, the thread drives a message queue and sequentially processes messages in the message queue. A message that is first inserted into the message queue is first processed.

In a running process of a third-party application program, when obtaining the probing response corresponding to the target thread, a monitoring component may send a probing message to the target thread in the third-party application program. The probing message is used for instructing the target thread to return the probing response when processing the probing message.

In this exemplary embodiment, the probing message may be specifically a probe message, and the probing response may be a probe response for the probe message. In a running process of the third-party application program, the monitoring component may send the probe message to the target thread in the third-party application program, that is, the probe message is inserted into a message queue in the target thread. The probe message may carry no other information than an identifier of the probe message (used for indicating that the message is a probe message). When sequentially processing messages in the message queue, if a message that is currently processed is confirmed to be a probe message based on the identifier, the target thread does not perform further processing and directly returns a probe response to a sender of the probe message. The probe response may also include only an identifier of the probe response (used for indicating that the response is a probe response).

Specifically, code of sending the probe message by the monitoring component and returning the probe response by the target thread may be as follows:

1) The monitoring component sends a probe message TRY_DEAD_CODE_DETECTION to the target thread:

targetHandler.sendEmptyMessage(TRY_DEAD_COD-E_DETECTION);

//targetHandler is a message queue handle of the target thread, and sendEmptyMessage inserts the message TRY_DEAD_CODE_DETECTION into the message queue of the target thread by using the handle.

2) The target thread receives the probe message, if the target thread is not stuck, the target thread processes the message and returns a probe response DEAD_CODE_DE-TECTION_DONE:

```
public void handleMessage(Message msg) { //process the message
  queue switch (msg.what) {      // determine a message
  identifier
    case TRY_DEAD_CODE_DETECTION:     // the message
identifier is TRY_DEAD_CODE_DETECTION
``` origionalHandler.sendEmptyMessage(DEAD_CODE_DETECTION_DONE); //origionalHandler is a message queue handle corresponding to a thread of the monitoring component, and sendEmptyMessage inserts the message DEAD_CODE_DETECTION_DONE into the message queue of the thread of the monitoring component by using the handle

```
        break;      // jump a message identifier judgment
    }
}
```

Alternatively, as long as a message can instruct the target thread to return the response to the monitoring component during processing, the probing message may alternatively be the message of another type other than the probe message.

Optionally, the foregoing solution uses an example in which the monitoring component actively sends the probing message to the target thread to trigger the target thread to return the probing response for description. In an actual application, the monitoring component may alternatively obtain the probing response in another manner. For example, in the normal running process of the target thread, the probing response may be generated at a specified time and sent to the monitoring component. In this case, the monitoring component only needs to passively receive the probing response.

Operation 202: Detect whether the probing response is obtained within a time duration of a first predetermined time length after the obtaining of the probing response is started.

An example in which a monitoring component actively sends a probing message is described. After the monitoring component sends the probing message to the target thread, if the target thread is not stuck, when processing the probing message, the target thread returns a probing response to the monitoring component. Correspondingly, if the target thread is stuck, the probing message is not processed in a long time. Therefore, in this exemplary embodiment, after sending the probing message, the monitoring component may detect whether the probing response returned by the target thread is received within the time duration of the first predetermined time length after the probing message is sent. If the probing response is received within the time duration of the first predetermined time length, the target thread is considered not to be stuck; otherwise, if the probing response is not received within the time duration of the first predetermined time length, the target thread is considered to be stuck, and a subsequent operation is performed.

Operation 203: Obtain function call information of the target thread when the probing response is not obtained within the time duration of the first predetermined time length, the function call information being information used for analyzing a cause of the target thread being stuck. For example, the function call information may be used for indicating a function call condition of the target thread.

If a monitoring component does not obtain the probing response within the time duration of the first predetermined time length, the target thread is considered to be stuck. In this case, the monitoring component may automatically obtain the function call information of the target thread, so as to obtain the function call condition of the target thread in time.

The monitoring component may obtain the function call information of the target thread by using a signal-catching function. For example, the monitoring component may obtain context information of the target thread from a system layer by using the signal-catching function, parse the context information, and parse a call stack of the target thread carried in the context information into the function call information. The call stack is used for indicating a function call relationship of the target thread and a file and a row number of each function in the function call relationship.

Specifically, an example in which the monitoring component obtains the call stack of the target thread by using a sigaction function is used. The monitoring component registers a signal-catching function sa_sigaction by using the sigaction in advance, and code of the registration is as follows:

```
    struct sigaction act;       // declare a variable
    act.sa_sigaction = sa_sigaction;   // set the signal-catching
function as sa_sigaction
    sigaction(SIGABRT, &act, NULL);   // register a catching function
of a signal SIGABRT
```

If the monitoring component does not receive the probing response within the time duration of the first predetermined time length, the monitoring component sends a signal to a handle of the target thread by using a pthread_kill method, and code is as follows:

pthread_kill(thread_handler, SIGABRT); //send a signal SIGABRT to a handle of the target thread thread_handler to trigger the signal-catching function Based on receiving the signal, the system layer obtains the context information of the target thread based on the handle of the target thread. The context information of the target thread includes a current call stack of the target thread. The call stack includes related information for positioning code logic. For example, the call stack includes information for indicating the function call relationship of the target thread and the file and the row number of each function in the function call relationship. The system layer adds the obtained context information of the target thread to the signal-catching function sa_sigaction, and returns the signal-catching function sa_sigaction to the monitoring component. The monitoring component parses the context information in the signal-catching function sa_sigaction, to obtain the current call stack of the target thread and use the call stack as the function call information of the target thread.

Operation 204: Upload the obtained function call information to a server.

After obtaining the call stack of the target thread, the monitoring component may upload the obtained call stack to the server. A developer may obtain the call stack of the target thread when the target thread is stuck as long as the developer logs into the server, and investigate code that may be a cause of the target thread being stuck by using the function call relationship of the target thread and the file and the row number of each function in the function call relationship indicated by the call stack. The developer no longer needs to pack a program of a debuggable version and hand the program to a tester to reproduce the stuck phenomenon. This reduces costs and efforts of communication between the developer and the tester. In addition, programs of different versions may correspond to different code of a debugging tool. In the related art, when the function call information of the target thread is exported by using a debugging tool, the function call information can be successfully exported only when code of the debugging tool selected by the developer matches the program of the debuggable version. However, in the solution provided by this exemplary embodiment, the debugging tool is no longer needed to export the function call information of the target thread in the program of the debuggable version, so that the developer does not need to waste labor to set the debugging tool, thereby further improving test efficiency.

Figure 3:
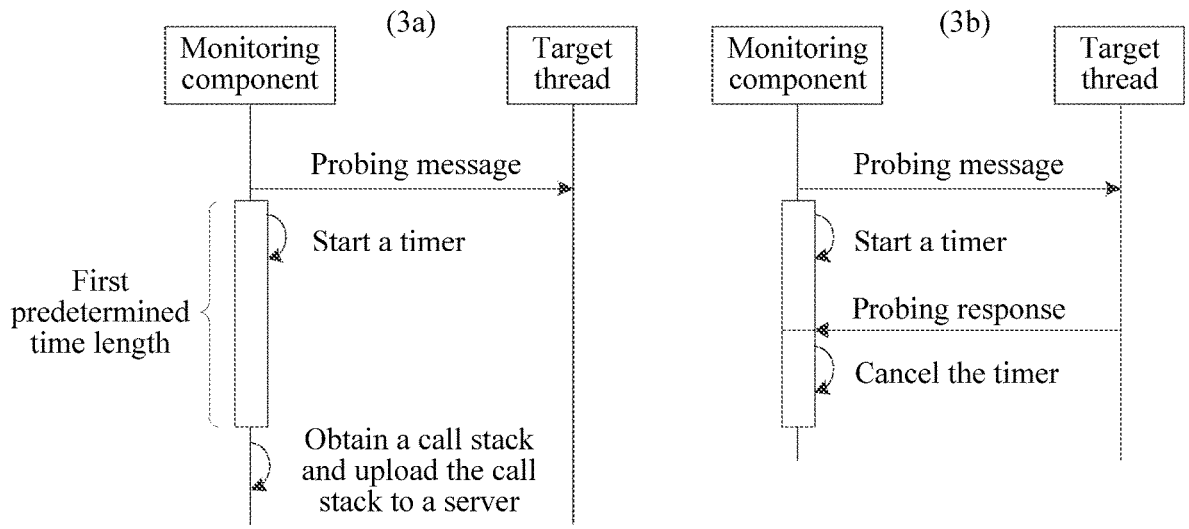
FIG. 3 is a sequence diagram of obtaining a call stack of a target thread according to an embodiment shown in FIG. 2.

FIG. 3 is a sequence diagram of obtaining a call stack of a target thread according to an exemplary embodiment. In FIG. 3, first, a monitoring component sends a probing message to the target thread and simultaneously starts a timer. A timing length of the timer is a first predetermined time length. In a running process of the timer, if the monitoring component does not receive a probing response returned by the target thread all the time, when the timer runs to the timing length, the monitoring component obtains a call stack of the target thread by using a sigaction function, and uploads the obtained call stack to a server (as shown in FIG. 3a). On the other hand, in the running process of the timer, if receiving the probing response returned by the target thread, the monitoring component cancels the time and waits to send the probing message to the target thread next time (as shown in FIG. 3b).

Thus, in the method shown in this exemplary embodiment, in a running process of the target thread, whether the target thread is stuck may be detected by obtaining a response message generated when the target thread normally runs, and when it is detected that the target thread is stuck, the function call information of the target thread is automatically obtained and uploaded to the server. A developer may obtain a function call condition in a third-party application program when the target thread is stuck as long as the developer logs into the server. The function call information can be obtained in time when a phenomenon that the target thread is stuck is found. This improves timeliness of problem fixing of the developer. In addition, the developer does not need to specially pack a program of a debuggable version, a tester does not need to reproduce, by using the program of the debuggable version, the phenomenon that the target thread is stuck, and the developer does not need to waste labor to set a debugging tool matching the program of the debuggable version. This prevents a process of reproducing the phenomenon that the thread is stuck and exporting information from wasting a large amount of test time, and avoids a problem, which is caused due to a difference exists between the program of the debuggable version and an application program of an officially-released version, that a deviation is generated in the process of reproducing the phenomenon that thread data is stuck. In addition, this reduces costs and efforts of communication between the developer and the tester, so that efficiency of software testing and accuracy of a test result are improved.

In the exemplary embodiment shown in FIG. 2, the monitoring component may periodically obtain the probing message generated when the target thread normally runs. Optionally, a phenomenon that the target thread in the third-party application program is stuck is usually caused due to interaction between a user and the third-party application program. To reduce system overheads, avoid resource waste, and ensure that the function call information of the target thread may be obtained in time when the target thread is stuck, in the solution provided by the disclosure, when a user operation related to the target thread is detected, the probing response generated when the target thread normally runs is started, and the probing response is not obtained during other time. For illustrative purposes, the following embodiment uses an example in which a probing message is sent to the target thread when the user operation related to the target thread is detected.

Figure 4:
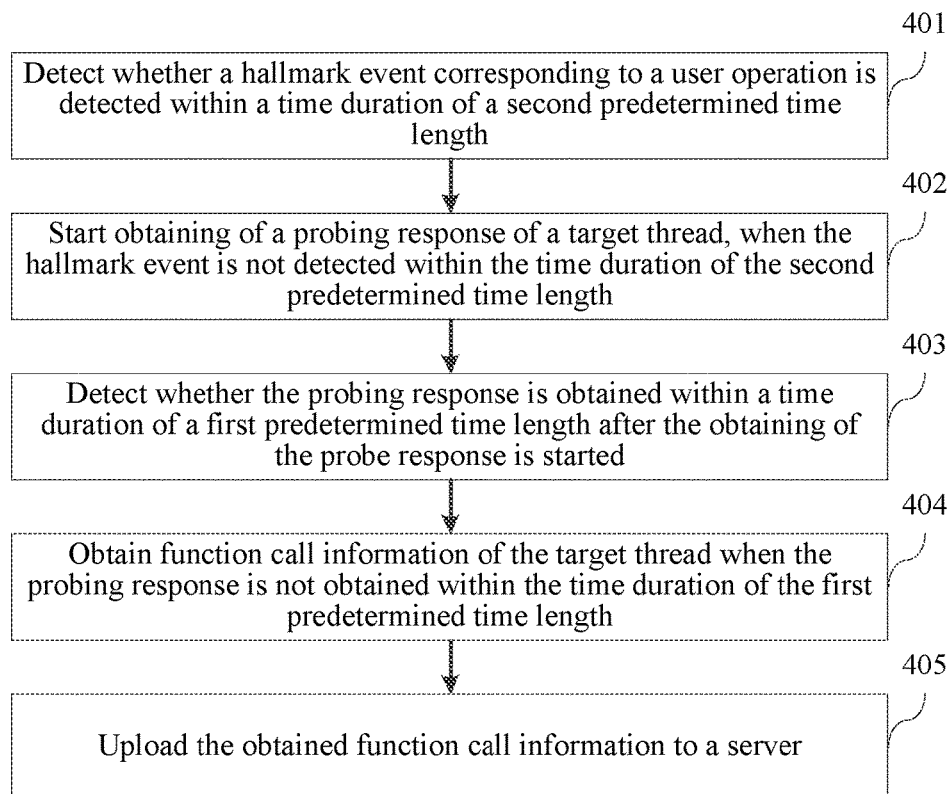
FIG. 4 is a flowchart of a thread data processing method according to an exemplary embodiment.

FIG. 4 is a flowchart of a thread data processing method according to an exemplary embodiment, and the method may be applied to the terminal 110 in the implementation environment shown in FIG. 1. As shown in FIG. 4, the thread data processing method may include the following operations.

Operation 401: Detect, in a running process of a third-party application program, whether a hallmark event corresponding to the user operation is detected within a time duration of a second predetermined time length.

The time duration of the second predetermined time length is a time duration after the user operation processed by a target thread in the third-party application program is received.

In the third-party application program that can implement user interaction, when an operation performed by a user in an interaction interface of the third-party application program is received, if the operation is processed by a corresponding thread, generally, a corresponding hallmark event is generated. From the time when the operation performed in the third-party application program is received, a monitoring component may detect whether the hallmark event generated when the user operation is processed by the target thread is detected within the subsequent time duration of the second predetermined time length. If the hallmark event is not detected within the time duration of the second predetermined time length, it may be considered that the target thread may be stuck, and a subsequent operation 402 is performed. On the other hand, if the monitoring component detects the hallmark event within the subsequent time duration of the second predetermined time length, it is considered that the target thread is not stuck, the subsequent operation 402 is not performed and the process of the foregoing hallmark event monitoring is repeated when the user operation performed by the user in the third-party application program is received next time.

Figure 5:
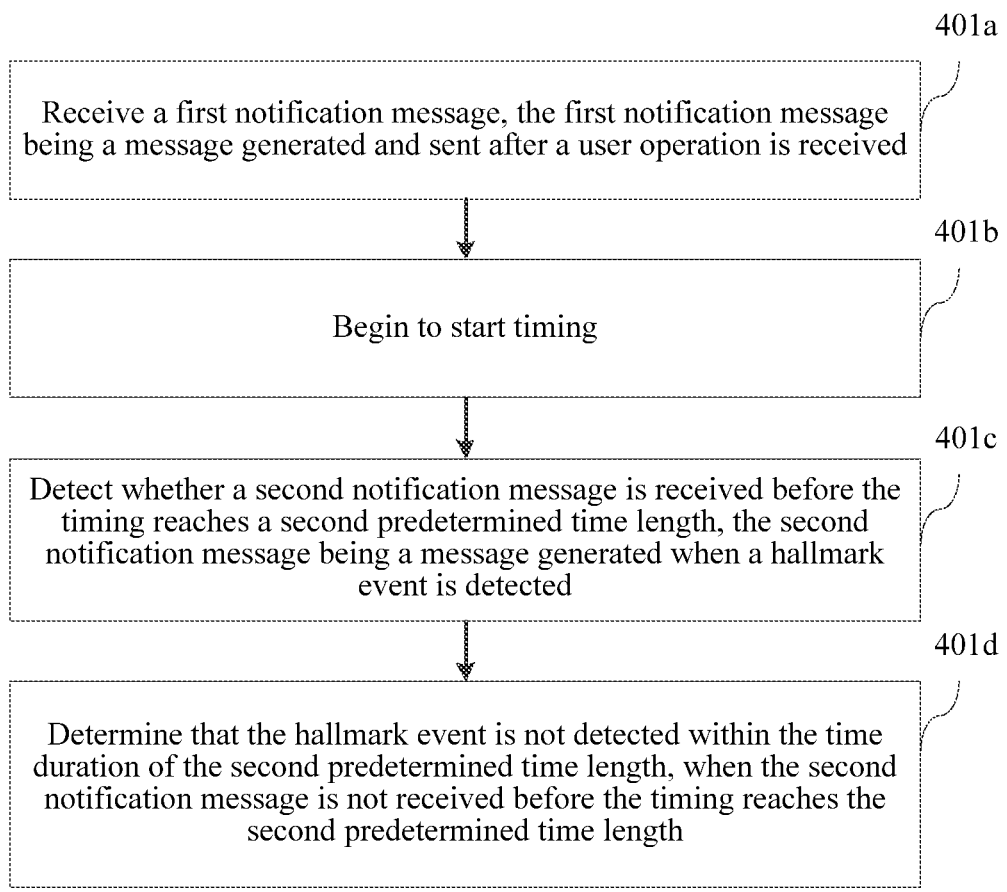
FIG. 5 is a flowchart of a method for monitoring a hallmark event corresponding to a user operation according to an embodiment shown in FIG. 4.

For example, an example in which the third-party application program is a browser and the target thread in the third-party application program is a kernel thread of the browser is described. FIG. 5 is a flowchart of a method for monitoring a hallmark event corresponding to a user operation according to an exemplary embodiment, and the method may include the following operations.

Operation 401a: Receive a first notification message, the first notification message being a message generated and sent after the user operation is received.

In the browser, an example of each tab page may be implemented as a WebView control. After receiving the user operation (e.g., an operation performed by a user in a corresponding tab page of the browser) processed by the kernel thread, the WebView control not only notifies the kernel thread to process the user operation, but also generates and sends the first notification message to the monitoring component.

In this exemplary embodiment, the kernel thread in the browser may be a thread that executes code of a rendering engine of the browser.

Operation 401b: start timing (or start a timer).

After receiving the first notification message, the monitoring component confirms that the browser receives the related user operation and starts a timer (e.g., TIMER A) whose timing length is the second predetermined time length.

Operation 401c: Detect whether a second notification message is received before the timing reaches the second predetermined time length, the second notification message being a message generated when the hallmark event is detected.

After notifying the target thread to process the user operation, a WebView control detects whether the hallmark event generated when the target thread processes the user operation occurs. If detecting that the hallmark event occurs, the WebView control generates and sends the second notification message to the monitoring component; otherwise, the WebView control does not send the second notification message.

Operation 401*d*: Determine that the hallmark event is not detected within the time duration of the second predetermined time length, when the second notification message is not received before the timing reaches the second predetermined time length.

In a running process of the timer TIMER A, if the monitoring component receives the second notification message sent by a WebView control, it is determined that the hallmark event is detected within the time duration of the second predetermined time length after the monitoring component receives the user operation processed by the target thread. In this case, it shows that the target thread normally runs, and the timer TIMER A is canceled. If the timer TIMER A runs to reach the second predetermined time length, the monitoring component still does not receive the second notification message sent by the WebView control, it is determined that the hallmark event is not detected within the time duration of the second predetermined time length. This shows that the target thread may be stuck and a subsequent operation 402 is performed.

Specifically, an example in which the user performs an operation of entering a website address, an operation of going back to a previous page, an operation of going to a next page, and an operation of refreshing a current page is described. When the user performs the foregoing operations in the browser, after successfully processing the foregoing operation, the kernel thread of the browser sends a history stack changing message to the WebView control, the history stack changing message being used for instructing the WebView control to change a history stack (which is used for recording a stack of a website address displayed by a tab page corresponding to the WebView control) of the browser. Therefore, in this exemplary embodiment, the user operation may include the operation of entering a website address, the operation of going back to a previous page, the operation of going to a next page, and the operation of refreshing a current page, and the hallmark event may be set to be: the WebView control receives the history stack changing message sent by the target thread.

Operation 402: Start obtaining of a probing response of a target thread, when the hallmark event is not detected within the time duration of the second predetermined time length.

Operation 403: Detect whether the probing response is obtained within a time duration of a first predetermined time length after the obtaining of the probe response is started.

Operation 404: Obtain function call information of the target thread when the probing response is not obtained within the time duration of the first predetermined time length, the function call information being information used for analyzing a cause of the target thread being stuck.

For execution processes of the foregoing operation 402 to operation 404, refer to operation 201 to operation 203 in the embodiment shown in FIG. 2, which are not further described herein.

Operation 405: Upload the obtained function call information to a server.

Optionally, in this exemplary embodiment, the function call information may further include a version number of a third-party application program corresponding to the target thread, so that a developer performs investigation on code of the application program of the corresponding version based on the function call information.

Optionally, in a possible case, due to reasons such as thread hysteresis and the like, the monitoring component does not detect, within the time duration of the second predetermined time length, the hallmark event generated when the user operation is processed by the target thread, but detects the hallmark event within the time duration of the first predetermined time length after the obtaining of the probing response is started. In this case, even if the monitoring component does not receive the probing response generated by the target thread, it may be confirmed that the target thread is not stuck, and the subsequent operation of obtaining function call information of the target thread does not need to be performed. That is, when the monitoring component does not obtain the probing response within the time duration of the first predetermined time length and does not detect the hallmark event, the monitoring component performs the operation of obtaining function call information of the target thread.

Figure 6:
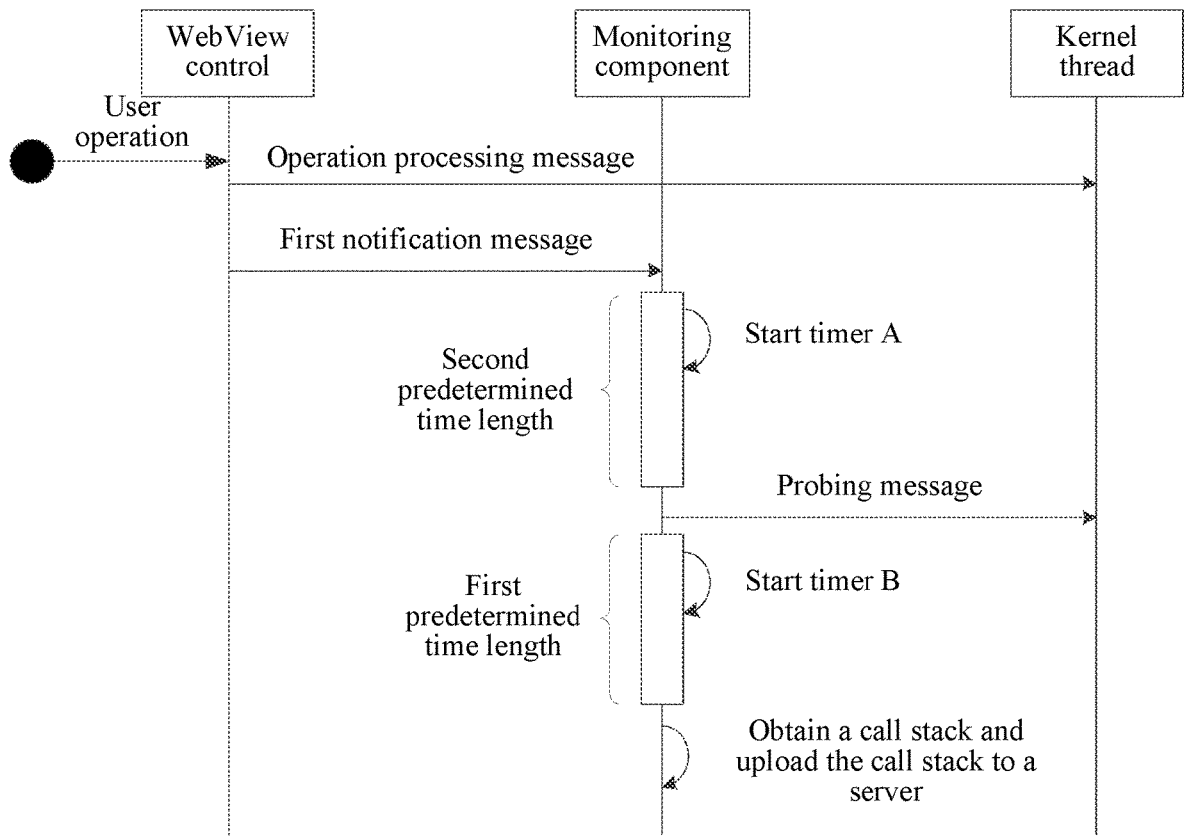
FIG. 6 is a sequence diagram of obtaining a call stack of a target thread according to an embodiment shown in FIG. 4.

FIG. 6 is a sequence diagram of obtaining a call stack of a target thread according to an exemplary embodiment. As shown in FIG. 6, a WebView control of a browser running in a terminal displays a current tab page of the browser, and a user may perform an operation on the tab page by clicking on a button in the or in a sliding and touching manner. When receiving a specified user operation (for example, an operation of entering a website address, an operation of going back to a previous page, an operation of going to a next page, or an operation of refreshing a current page), the WebView control sends an operation processing message to a kernel thread, and instructs the kernel thread to process the received user operation.

In addition, the WebView control sends a first notification message to a monitoring component. After receiving the first notification message, the monitoring component starts a timer TIMER A whose timing length is a second predetermined time length. In a running process of the timer TIMER A, if the kernel thread is not stuck and processes the foregoing user operation, the kernel thread sends a history stack changing message to the WebView control. In this case, the WebView control sends a second notification message to the monitoring component (not shown in FIG. 6). After the monitoring component receives the second notification message, it is considered that the kernel thread normally runs, and the timer TIMER A is canceled. When receiving the first notification message next time, the monitoring component restarts the timer TIMER A. If the timer TIMER A runs to reach the timing length, the monitoring component still does not receive the second notification message sent by the WebView control, it is considered that the kernel thread may be stuck. In this case, the monitoring component sends a probing message to the kernel thread, and simultaneously starts a timer TIMER B whose timing length is the first predetermined time length. In a running process of the timer TIMER B, if the monitoring component receives the probing response returned by the kernel thread (not shown in FIG. 6), it is considered that the kernel thread normally works. That is, a reason that the WebView control does not receive the history stack changing message does not lie in that the kernel thread is stuck. In this case, the monitoring component cancels the timer TIMER B. alternatively, in the running process of the timer TIMER B, if the monitoring component does not receive the probing response returned by the kernel thread but receives the second notification message sent by the WebView control, in this case, the monitoring component also cancels the timer TIMER B. If the timer TIMER B runs to reach the timing length, the monitoring component receives neither the probing response returned by the kernel thread nor the second notification message sent by the WebView control, it is considered that the kernel thread is stuck. In this case, the monitoring component obtains context information of the kernel thread from a system layer by using a signal-catching function, parses the context information to obtain a call stack of the kernel thread, and uploads the call stack to the server for ease of investigation by a developer.

In the foregoing solution, for illustrative purposes, an example in which the WebView control receives the user operation, monitors a hallmark event, and sends a notification message is described. In an actual application, the foregoing operations performed by the WebView control may alternatively be performed by a main thread (that is, a thread that executes part of code of user interaction logic in the browser) of the browser. For example, when receiving the user operation, the main thread of the browser notifies the kernel thread to perform the user operation and simultaneously sends the first notification message to the monitoring component. When detecting the hallmark event (that is, receiving the history stack changing message), the main thread of the browser sends the second notification message to the monitoring component.

Optionally, in the solution according to this exemplary embodiment, the monitoring component first detects whether the hallmark event is detected within a time duration of a second predetermined time length after receiving the user operation. If the monitoring component does not detect the hallmark event, it is considered that the target thread may be stuck. The monitoring component verifies, within a time duration of a first predetermined time length after the time duration of the second predetermined time length ends, whether the target thread is really stuck by obtaining a probing response of the target thread. In an actual application, if the monitoring component does not detect the hallmark event within the time duration of the second predetermined time length after receiving the user operation, the monitoring component may alternatively not perform the operation of verifying whether the target thread is really stuck. That is, when receiving the user operation processed by the target thread, the monitoring component detects whether the hallmark event is detected within the subsequent time duration of the second predetermined time length. If the monitoring component does not detect the hallmark event within the time duration of the second predetermined time length, the monitoring component obtains function call information of the target thread. Specifically, for example, the probing response may alternatively be a response message generated when the hallmark event is detected. That is, when a third-party application program receives the user operation, if the target thread normally runs and processes the user operation and when the third-party application program detects the hallmark event corresponding to the user operation, the target thread generates the probing response. When the third-party application program receives the user operation, the monitoring component starts obtaining of the probing response. If the monitoring component does not obtain the probing response within the time duration of the second predetermined time length after the monitoring component starts the obtaining of the probing response, it is considered that the target thread may be stuck and the operation of obtaining function call information of the target thread is performed.

Thus, in the method shown in this exemplary embodiment, in a running process of the target thread, whether the target thread in the third-party application program is stuck may be detected by obtaining a response message generated when the target thread normally runs, and when it is detected that the target thread is stuck, the function call information of the target thread is automatically obtained and uploaded to the server. A developer may obtain a function call condition in a third-party application program when the target thread is stuck as long as the developer logs into the server. The function call information can be promptly obtained when a phenomenon that the target thread is stuck is found. This improves timeliness of problem fixing of the developer. In addition, the developer does not need to specially pack a program of a debuggable version, a tester does not need to reproduce, by using the program of the debuggable version, the phenomenon that the target thread is stuck, and the developer does not need to waste labor to set a debugging tool matching the program of the debuggable version. This prevents a process of reproducing the phenomenon that the thread is stuck and exporting information from wasting a large amount of test time, and avoids a problem, which is caused due to a difference exists between the program of the debuggable version and an application program of an officially-released version, that a deviation is generated in the process of reproducing the phenomenon that thread data is stuck. In addition, this reduces costs and efforts of communication between the developer and the tester, so that efficiency of software testing and accuracy of a test result are improved.

It should be noted that, in the embodiment shown in FIG. 4, only an example in which the target thread is the kernel thread of the browser, the user operation is the operation of entering a website address, the operation of going back to a previous page, the operation of going to a next page, or the operation of refreshing a current page, the hallmark event is an application scenario in which the WebView control of the browser receives the history stack change message sent by the kernel thread is described, for illustrative purposes. In an actual application, the solutions provided by the disclosure are not limited to the foregoing application scenarios.

For example, when the target thread is the kernel thread of the browser, the user operation may not be limited to the foregoing operations and may include some other operations that can be performed in the browser (for example, an operation that scales up and down a page of the browser). As long as a kernel thread can generate a corresponding event that can be monitored when the kernel thread processes the user operation, the kernel thread may implement the solutions according to the disclosure.

Further, the target thread is not limited to the kernel thread of the browser, and may alternatively be a thread in the browser for processing the user operation other than the kernel thread, or a thread in a third-party application program of another type for processing the user operation. As long as the target thread can generate a corresponding event that can be monitored when the kernel thread processes the user operation, the target thread may implement the solutions according to the disclosure.

Hereinafter, exemplary embodiments of an apparatus, which can be used to execute the method embodiments, are described. For details not disclosed in the apparatus embodiments of the disclosure, refer to the method embodiments of the disclosure.

Figure 7:
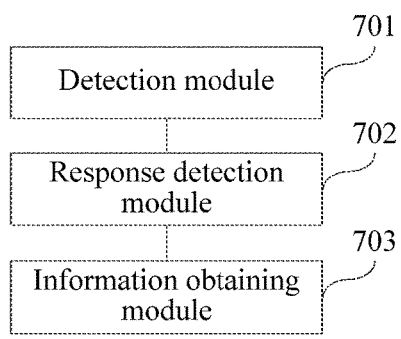
FIG. 7 is a block diagram of a thread data processing apparatus according to an exemplary embodiment.

FIG. 7 is a block diagram of a thread data processing apparatus according to an exemplary embodiment. The thread data processing apparatus according to an exemplary embodiment may be implemented, by means of hardware or a combination of hardware and software, as the entire or a part of the terminal 110 in the implementation environment shown in FIG. 1. For example, the thread data processing apparatus may be implemented by a processor (e.g., a central processing unit (CPU)) included in the terminal 110.

The thread data processing apparatus may include:

a detection module 701, configured to start obtaining of a probing response corresponding to a target thread, the probing response being a response message generated in a normal running process of the target thread;

a response detection module 702, configured to detect whether the probing response is obtained within a time duration of a first predetermined time length after the obtaining of the probing response is started; and an information obtaining module 703, configured to: obtain function call information of the target thread when the probing response is not obtained within the time duration of the first predetermined time length, the function call information being information used for analyzing a cause of the target thread being stuck.

Optionally, the apparatus further includes:

an event detection module, configured to: detect, before the obtaining of the probing response of the target thread is started, whether a hallmark event is detected within a time duration of a second predetermined time length, the time duration of the second predetermined time length being a time duration after a user operation processed by the target thread is received; and the detection module is configured to perform the operation of starting obtaining of a probing response of a target thread, when the hallmark event is not detected within the time duration of the second predetermined time length, where the hallmark event is an event generated when the user operation is processed by the target thread.

Optionally, the event detection module includes:

a notification receiving unit, configured to receive a first notification message, the first notification message being a message generated after the user operation is received;

a timing unit, configured to start a timer to begin timing;

a notification detection unit, configured to: detect whether a second notification message is received before the timing of the timer reaches the second predetermined time length, the second notification message being a message generated when the iconic event is detected; and a determining unit, configured to determine that the iconic event is not detected within the time duration of the second predetermined time length, when the second notification message is not received before the timing of the timer reaches the second predetermined time length.

Optionally, the target thread is a kernel thread of a browser, and the user operation includes an operation of entering a web site address, an operation of going back to a previous page, an operation of going to a next page, or an operation of refreshing a current page. The hallmark event is: receiving a history stack changing message sent by the target thread, the history stack changing message being used for instructing to change a history stack of the browser.

Optionally, the information obtaining module is configured to perform the operation of obtaining function call information of the target thread, when the probing response is not obtained within the time duration of the first predetermined time length and the hallmark event is not detected.

Optionally, the information obtaining module includes:

a context obtaining unit, configured to obtain context information of the target thread from a system layer by using a signal-catching function; and a parsing unit, configured to: parse a call stack of the target thread carried in the context information into the function call information, the call stack being used for indicating a function call relationship of the target thread and a file and a row number of each function in the function call relationship.

Optionally, the probing response is a response message generated when a hallmark event is detected, the hallmark event being an event generated after the target thread processes a user operation.

The detection module is configured to start the obtaining of the probing response, when the user operation is received.

Optionally, the function call information further includes a version number of a third-party application program, and the apparatus further includes:

an uploading module, configured to upload the obtained function call information to a server.

Thus, in the apparatus according to an exemplary embodiment, whether the target thread in the third-party application program is stuck may be automatically detected by obtaining a response message generated when the target thread normally runs, and when it is detected that the target thread is stuck, the function call information of the target thread is automatically obtained and uploaded to the server. A developer may obtain a function call condition in a third-party application program when the target thread is stuck as long as the developer logs into the server. The function call information can be obtained in time when a phenomenon that the target thread is stuck is found. This improves timeliness of problem fixing of the developer. In addition, the developer does not need to specially pack a program of a debuggable version, a tester does not need to reproduce, by using the program of the debuggable version, the phenomenon that the target thread is stuck, and the developer does not need to waste labor to set a debugging tool matching the program of the debuggable version. This prevents a process of reproducing the phenomenon that the thread is stuck and exporting information from wasting a large amount of test time, and avoids a problem, which is caused due to a difference exists between the program of the debuggable version and an application program of an officially-released version, that a deviation is generated in the process of reproducing the phenomenon that thread data is stuck. In addition, this reduces costs and efforts of communication between the developer and the tester, so that efficiency of software testing and accuracy of a test result are improved.

An exemplary embodiment further provides a non-transitory computer readable storage medium including an instruction, for example, a memory including instructions. The instructions may be executed by a processor of a server to implement the thread data processing method shown in the embodiments. For example, the non-transitory computer readable storage medium may be a ROM, a RAM, a CD-ROM, a magnetic tape, a floppy disk, an optical data storage device, or the like.

Figure 8:
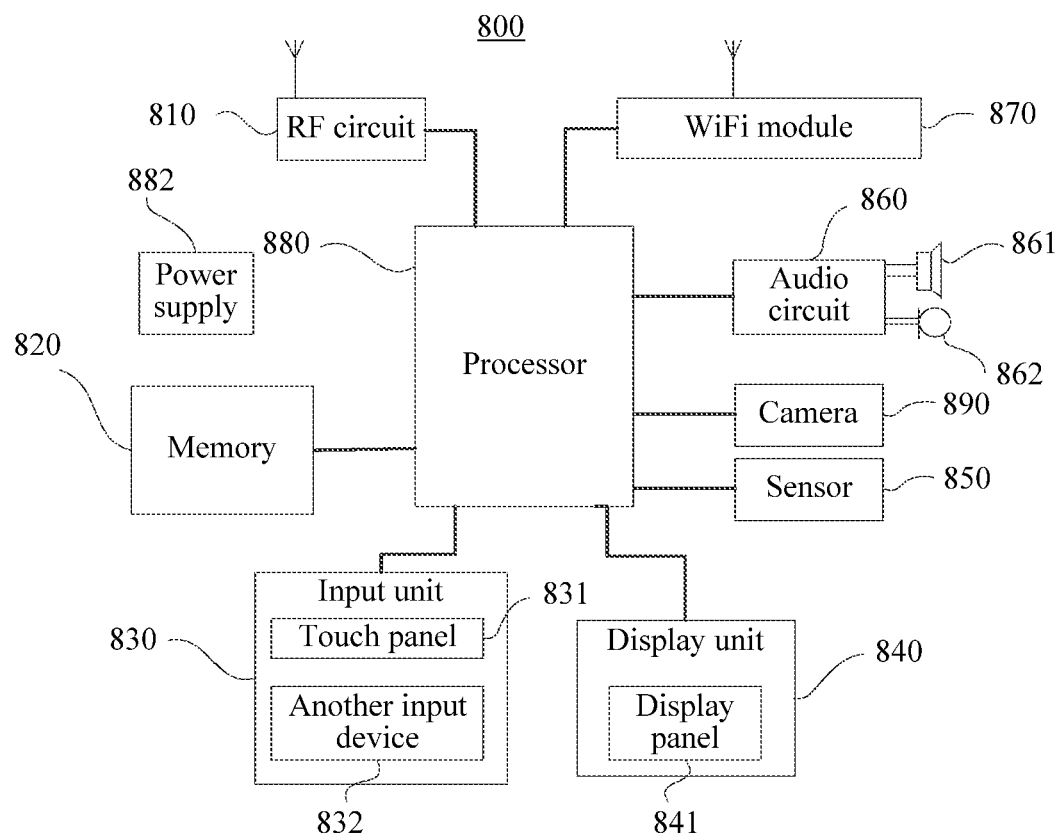
FIG. 8 is a schematic structural diagram of a terminal according to an exemplary embodiment.

FIG. 8 shows a schematic structural diagram of a terminal according to an exemplary embodiment. A terminal 800 according to an exemplary embodiment may include one or more components as follows: a processor configured to execute a computer program instruction to complete various processes and methods, a random access memory (RAM) and a read only memory (ROM) that are configured to store information and a program instruction, a memory configured to store data and information, an I/O device, an interface, an antenna, or the like.

The terminal 800 may include components such as a radio frequency (RF) circuit 810, a memory 820, an input unit (or an input device or an input circuitry) 830, a display unit (or a display) 840, a sensor 850, an audio circuit 860, a wireless fidelity (WiFi) module 870, a processor 880, a power supply 882, and a camera 890. A person skilled in the art may understand that the structure of the terminal shown in FIG. 8 does not constitute a limit to the terminal, and the terminal may include more components or fewer components than those shown in the figure, or some components may be combined, or a different component deployment may be used.

The RF circuit 810 may be configured to receive and send a signal during an information receiving and sending process or a call process. Specifically, the RF circuit receives downlink information from a base station, and then delivers the downlink information to the processor 880 for processing. In addition, the RF circuit and sends data designed uplink to the base station. Generally, the RF circuit includes, but is not limited to, an antenna, at least one amplifier, a transceiver, a coupler, a low noise amplifier (LNA), a duplexer, and the like. In addition, the RF circuit 810 may also communicate with a network and another device through wireless communication. The wireless communication may use any communication standard or protocol, including but not limited to Global System for Mobile communications (GSM), general packet radio service (GPRS), Code Division Multiple Access (CDMA), Wideband Code Division Multiple Access (WCDMA), Long Term Evolution (LTE), email, short messaging service (SMS), and the like.

The memory 820 may be configured to store a software program and module. The processor 880 runs the software program and module stored in the memory 820, to implement various functional applications and data processing of the terminal 800. The memory 820 may mainly include a program storage area and a data storage area. The program storage area may store an operating system, an application program for performing at least one function (e.g., a sound play function and an image display function), and the like. The data storage area may store data (e.g., audio data and an address book) created based on use of the terminal 800, and the like. In addition, the memory 820 may include a high speed random access memory, and may also include a non-volatile memory, such as at least one magnetic disk storage device, a flash memory, or another volatile solid-state storage device.

The input unit 830 may be configured to receive input digit or character information, and generate a keyboard signal input related to user setting and function control of the terminal 800. Specifically, the input unit 830 may include a touch panel 831 and another input device 832. The touch panel 831, which may also be referred to as a touchscreen, may collect a touch operation of a user on or near the touch panel (e.g., an operation of a user on or near the touch panel 831 by using any suitable object or accessory such as a finger or a stylus), and drive a corresponding connection apparatus based on a preset program. Optionally, the touch panel 831 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 880. Moreover, the touch controller can receive and execute a command sent by the processor 880. In addition, the touch panel 831 may be a resistive, capacitive, infrared, or surface sound wave type touch panel. In addition to the touch panel 831, the input unit 830 may further include the another input device 832. Specifically, the another input device 832 may include, but is not limited to, one or more of a physical keyboard, a functional key (e.g., a volume control key or a switch key), a track ball, a mouse, and a joystick.

The display unit 840 may be configured to display information entered by the user or information provided for the user, and various menus of the terminal 800. The display unit 840 may include a display panel 841. Optionally, the display panel 841 may be configured by using a liquid crystal display (LCD), an organic light-emitting diode (OLED), or the like. Further, the touch panel 831 may cover the display panel 841. After detecting a touch operation on or near the touch panel 831, the touch panel 831 transfers the touch operation to the processor 880, so as to determine a type of a touch event. Then, the processor 880 provides corresponding visual output on the display panel 841 based on the type of the touch event. Although, in FIG. 8, the touch panel 831 and the display panel 841 are used as two separate parts to implement input and output functions of the terminal 800, in some embodiments, the touch panel 831 and the display panel 841 may be integrated to implement the input and output functions of the terminal 800.

The terminal 800 may further include at least one sensor 850, such as a gyro sensor, a magnetic induction sensor, an optical sensor, a motion sensor, and another sensor. Specifically, the optical sensor may include an ambient light sensor and a proximity sensor. The ambient light sensor may adjust luminance of the display panel 841 based on brightness of the ambient light. The proximity sensor may switch off the display panel 841 and/or backlight when the terminal 800 is moved to the ear. As one type of motion sensor, an acceleration sensor may detect magnitude of accelerations in various directions (generally on three axes), may detect magnitude and a direction of the gravity when static, and may be applied to an application that recognizes the attitude of the terminal (for example, switching between landscape orientation and portrait orientation, a related game, and magnetometer attitude calibration), a function related to vibration recognition (e.g., a pedometer and a knock), and the like. Other sensors such as a barometer, a hygrometer, a thermometer, and an infrared sensor, which may be configured in the terminal 800, are not further described herein.

The audio circuit 860, a speaker 861, and a microphone 862 may provide audio interfaces between the user and the terminal 800. The audio circuit 860 may convert received audio data into an electric signal and transmit the electric signal to the speaker 861. The speaker 861 converts the electric signal into a sound signal for output. On the other hand, the microphone 862 converts a collected sound signal into an electric signal. The audio circuit 860 receives the electric signal and converts the electric signal into audio data, and outputs the audio data to the processor 880 for processing. Then, the processor 880 sends the audio data to, for example, another terminal by using the RF circuit 810, or outputs the audio data to the memory 820 for further processing.

WiFi is a short distance wireless transmission technology. The terminal 800 can help, by using a WiFi module 870, the user to receive and send emails, browse a web page, access streaming media, and the like. The WiFi module provides wireless broadband Internet access for the user. Although FIG. 8 shows the WiFi module 870, it may be understood that the WiFi module 870 may be omitted depending on an embodiment.

The processor 880 is a control center of the terminal 800, and is connected to various parts of the entire terminal by using various interfaces and circuits. By running or executing the software program and/or module stored in the memory 820, and invoking data stored in the memory 820, the processor 880 performs various functions and data processing of the terminal 800, thereby performing overall monitoring on the terminal. Optionally, the processor 880 may include one or more processing units. In an exemplary embodiment, the processor 880 may integrate an application processor and a modem processor. The application processor mainly processes an operating system, a user interface, an application program, and the like. The modem processor mainly processes wireless communication. It may be understood that the foregoing modem processor may alternatively not be integrated into the processor 880.

The terminal 800 further includes the power supply 882 (e.g., a battery) for supplying power to the components. In an exemplary embodiment, the power supply may be logically connected to the processor 880 by using a power management system, thereby implementing functions such as charging, discharging, and power consumption management by using the power management system.

The camera 890 may include a lens, an image sensor, an interface, a digital signal processor, a CPU, a display screen, and the like. The lens is fixed above the image sensor, and a focus may be changed by manually adjusting the lens. The image sensor is equivalent to a "film" of a conventional camera, and is a core for the camera to acquire an image. The interface is configured to connect the camera to a mainboard of the terminal by using a flat cable, a board-to-board connector, and a spring, to send the acquired image to the memory 820. The digital signal processor processes the acquired image through mathematical operations, to convert the acquired analog image into a digital image and send the digital image to the memory 820 by using the interface.

Although not shown in the figure, the terminal 800 may further include a Bluetooth module and the like, which are not further described herein.

In addition to one or more processors 880, the terminal 800 further includes a memory, and one or more programs. The one or more programs are stored in the memory, and are configured to be executed by the one or more processors. The processor 880 executes the one or more programs to implement all or some operations of the thread data processing method shown in the embodiments.

The technical solutions provided by the exemplary embodiments may include the following beneficial effects:

In a running process of the target thread, whether the target thread is stuck may be detected by obtaining the response message generated when the target thread normally runs, and the function call information of the target thread is automatically obtained when it is detected that the target thread is stuck. The function call information can be obtained in time when a phenomenon that the target thread is stuck is found, which improves timeliness of problem fixing of a developer. The developer does not need to specially pack a program of a debuggable version, and a tester does not need to reproduce, by using the program of the debuggable version, the phenomenon that the target thread is stuck, so that efficiency of software testing and accuracy of a test result are improved.

In an exemplary embodiment, a non-transitory computer readable storage medium including an instruction, for example, a storage device including an instruction, is further provided. The instruction may be executed by the processor of the terminal to implement all or some operations of the thread data processing method shown in the exemplary embodiments. For example, the non-transitory computer readable storage medium may be a ROM, a RAM, a CD-ROM, a magnetic tape, a floppy disk, an optical data storage device, or the like.

At least one of the components, elements, modules or units described herein may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing operations may employ any number of related art techniques for electronics configuration, signal processing and/or control, data processing and the like.

The "unit" or "module" used herein may be a hardware component such as a processor or a circuit, and/or a software component that is executed by a hardware component such as a processor.

After considering the specification and practicing the exemplary embodiments disclosed herein, a person skilled in the art would easily conceive of other implementations of the disclosure. The disclosure is intended to cover any variation, use, or adaptive change of exemplary embodiments. These variations, uses, or adaptive changes adhere to the general principles of the disclosure and include common general knowledge or common technical means, which are not disclosed herein, in the art. The specification and the embodiments are considered as merely exemplary, and the real scope and spirit of the disclosure are pointed out in the following claims.

It should be understood that the disclosure is not limited to the precise structures described above and shown in the accompanying drawings, and various modifications and changes can be made without departing from the scope of the disclosure. The scope of the disclosure is limited only by the appended claims.

What is claimed is:

1. A thread data processing method, comprising:

monitoring, by at least one processor of a terminal, whether a probing response corresponding to a target thread is obtained within a time duration of a first predetermined time length, the probing response being a response message generated in a normal running process of the target thread;

obtaining, by the at least one processor of the terminal, function call information of the target thread based on detection that the probing response is not obtained within the time duration of the first predetermined time length, the function call information indicating a function call condition of the target thread;

determining, by the at least one processor of the terminal, that a user operation related to the target thread is received, and detecting whether a hallmark event is detected within a time duration of a second predetermined time length from receiving the user operation, the hallmark event being an event generated when the user operation is processed by the target thread; and performing, by the at least one processor of the terminal, the monitoring in response to the hallmark event not being detected within the time duration of the second predetermined time length, and in response to the hallmark event being detected within the time duration of the second predetermined time length, determining that the target thread is not stuck and not performing the monitoring.

2. The method according to claim 1, wherein the detecting whether the hallmark event is detected comprises:

starting a timer in response to receiving a first notification message, the first notification message being a message generated when the user operation is received;

detecting whether a second notification message is received before the timer reaches the second predetermined time length, the second notification message being a message generated when the hallmark event is detected; and determining that the hallmark event is not detected within the time duration of the second predetermined time length, when the second notification message is not received before the timer reaches the second predetermined time length.

3. The method according to claim 2, wherein the target thread is a kernel thread of a browser, and the user operation comprises at least one of an operation of entering a website address, an operation of moving to a previous page, an operation of moving to a next page, or an operation of refreshing a current page; and the hallmark event comprises an event of receiving a history stack changing message, based on which a change of a history stack of the browser is instructed.

4. The method according to claim 2, wherein the detecting whether the hallmark event is detected further comprises, in response to the second notification message being received within the time duration of the second predetermined time length after the monitoring is started, cancelling the timer and determining that the target thread normally runs.

5. The method according to claim 1, wherein the obtaining the function call information comprises:

performing obtaining the function call information corresponding to the target thread, when the probing response is not obtained within the time duration of the first predetermined time length and the hallmark event is not detected.

6. The method according to claim 1, wherein the obtaining the function call information comprises:

obtaining context information of the target thread from a system layer by using a signal-catching function; and parsing a call stack of the target thread carried in the context information into the function call information, the call stack indicating a function call relationship of the target thread and a file and a row number of each function in the function call relationship.

7. The method according to claim 1, wherein the function call information further comprises a version number of a third-party application program, and the method further comprises:

uploading, by the at least one processor of the terminal, the obtained function call information to a server.

8. The method according to claim 1, wherein, when the monitoring is performed in response to the hallmark event not being detected within the time duration of the second predetermined time length, and the hallmark event is detected within the time duration of the first predetermined time length after the monitoring is started, the obtaining the function call information is not performed regardless of whether the probing response is received within the time duration of the first predetermined time length.

9. The method according to claim 8, wherein the monitoring comprises:

starting a timer of which a timing length is the first predetermined time length; and cancelling the timer in response to the hallmark event being detected within the time duration of the first predetermined time length.

10. A thread data processing apparatus, comprising:

at least one memory configured to store program code; and at least one processor configured to access the at least one memory and operate according to the program code, the program code comprising:

monitoring code configured to cause the at least one processor to monitor whether a probing response corresponding to a target thread is obtained within a time duration of a first predetermined time length, the probing response being a response message generated in a normal running process of the target thread;

information obtaining code configured to cause the at least one processor to obtain function call information of the target thread based on detection that the probing response is not obtained within the time duration of the first predetermined time length, the function call information indicating a function call condition of the target thread; and event detection code configured to cause the at least one processor to determine that a user operation related to the target thread is received, and detecting whether a hallmark event is detected within a time duration of a second predetermined time length from receiving the user operation, the hallmark event being an event generated when the user operation is processed by the target thread, wherein the monitoring code causes the at least one processor to perform monitoring whether the probing response is obtained in response to the hallmark event not being detected within the time duration of the second predetermined time length, and in response to the hallmark event being detected within the time duration of the second predetermined time length, determine that the target thread is not stuck and not perform the monitoring.

11. The apparatus according to claim 10, wherein the event detection code causes the at least one processor to:
receive a first notification message, the first notification message being a message generated after the user operation is received;
start a timer;
detect whether a second notification message is received before the timer reaches the second predetermined time length, the second notification message being a message generated when the hallmark event is detected; and
determine that the hallmark event is not detected within the time duration of the second predetermined time length, when the second notification message is not received before the timer reaches the second predetermined time length.

12. The apparatus according to claim 11, wherein the target thread is a kernel thread of a browser, and the user operation comprises at least one of an operation of entering a website address, an operation of moving to a previous page, an operation of moving to a next page, or an operation of refreshing a current page; and
the hallmark event comprises an event of receiving, from the target thread, a history stack changing message, based on which a change of a history stack of the browser is instructed.

13. The apparatus according to claim 10, wherein
the information obtaining code causes the at least one processor to perform obtaining the function call information corresponding to the target thread, when the probing response is not obtained within the time duration of the first predetermined time length and the hallmark event is not detected.

14. The apparatus according to claim 10, wherein the information obtaining code causes the at least one processor to:
obtain context information of the target thread from a system layer by using a signal-catching function; and
parse a call stack of the target thread carried in the context information into the function call information, the call stack indicating a function call relationship of the target thread and a file and a row number of each function in the function call relationship.

15. The apparatus according to claim 10, wherein the function call information further comprises a version number of a third-party application program, and the program code further comprises:
uploading code configured to cause the at least one processor to upload the obtained function call information to a server.

16. A non-transitory computer-readable storage medium, storing program code, which, when executed by at least one processor, causes the at least one processor to perform:

monitoring whether a probing response corresponding to a target thread is obtained within a time duration of a first predetermined time length, the probing response being a response message generated in a normal running process of the target thread;
obtaining function call information of the target thread based on detection that the probing response is not obtained within the time duration of the first predetermined time length, the function call information indicating a function call condition of the target thread;
determining that a user operation related to the target thread is received, and detecting whether a hallmark event is detected within a time duration of a second predetermined time length from receiving the user operation, the hallmark event being an event generated when the user operation is processed by the target thread;
performing the monitoring in response to the hallmark event not being detected within the time duration of the second predetermined time length, and in response to the hallmark event being detected within the time duration of the second predetermined time length, determining that the target thread is not stuck and not performing the monitoring.

17. The non-transitory computer-readable storage medium according to claim 16, wherein the detecting whether the hallmark event is detected comprises:
receiving a first notification message, the first notification message being a message generated when the user operation is received;
starting a timer;
detecting whether a second notification message is received before the timer reaches the second predetermined time length, the second notification message being a message generated when the hallmark event is detected; and
determining that the hallmark event is not detected within the time duration of the second predetermined time length, when the second notification message is not received before the timer reaches the second predetermined time length.

18. The non-transitory computer-readable storage medium according to claim 17, wherein the target thread is a kernel thread of a browser, and the user operation comprises at least one of an operation of entering a website address, an operation of moving to a previous page, an operation of moving to a next page, or an operation of refreshing a current page; and
the hallmark event comprises an event of receiving a history stack changing message, based on which a change of a history stack of the browser is instructed.

* * * * *